March 1, 1966 E. LONG ETAL 3,238,106
NUCLEAR REACTORS
Filed July 3, 1961
4 Sheets-Sheet 1
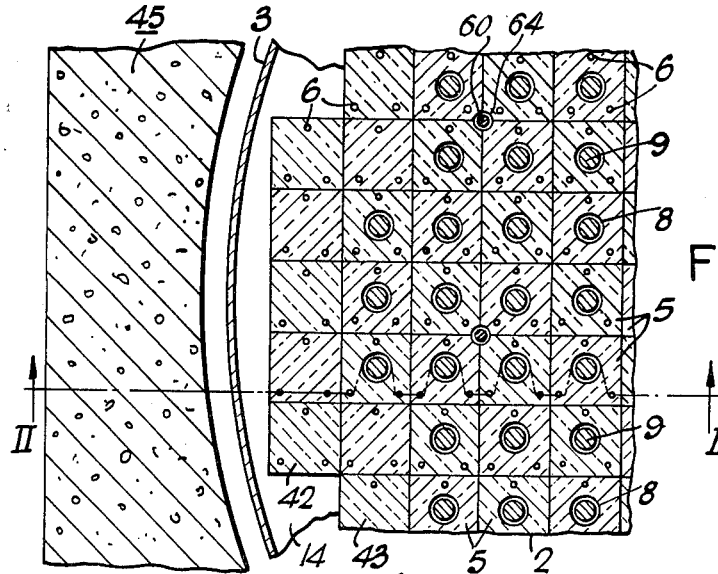
FIG.1.
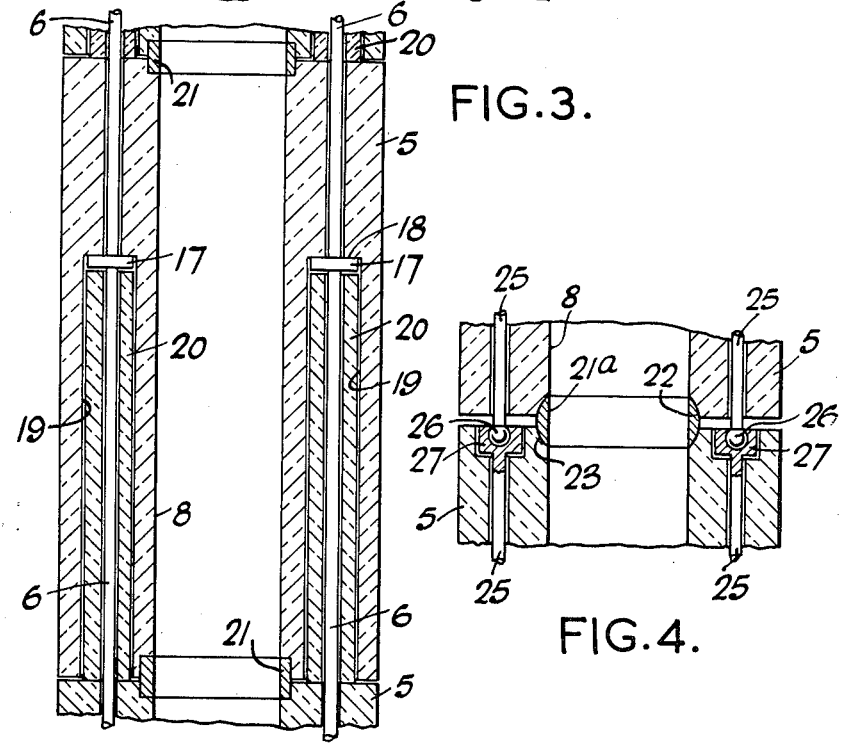
FIG.3.
FIG.4.

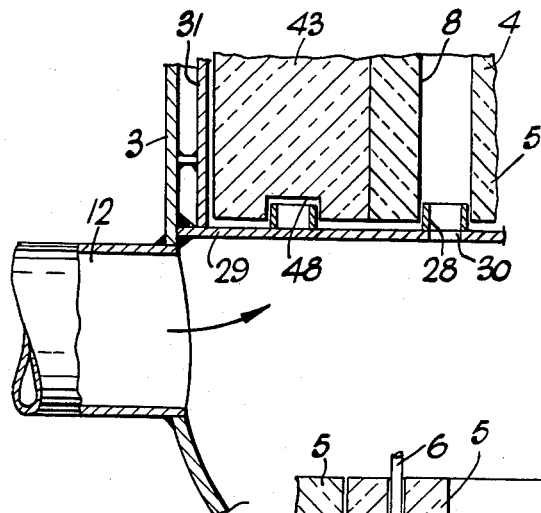
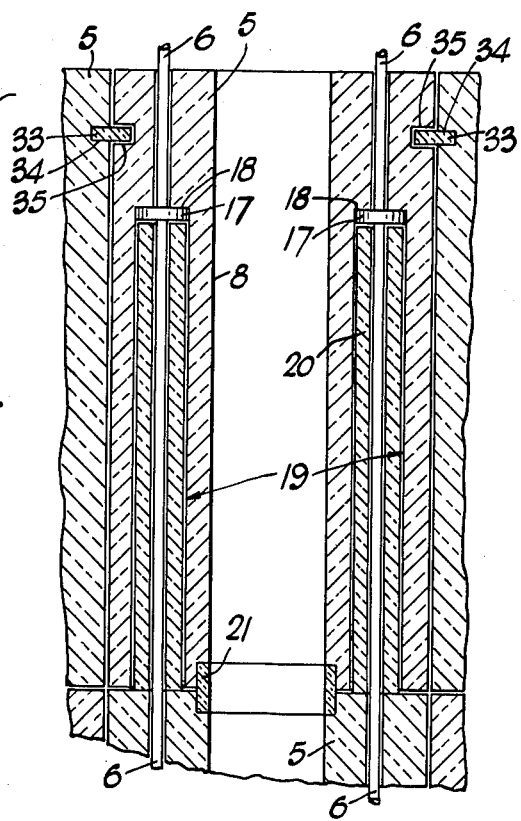

March 1, 1966   E. LONG ETAL   3,238,106
NUCLEAR REACTORS

Filed July 3, 1961

4 Sheets-Sheet 4

United States Patent Office 3,238,106
Patented Mar. 1, 1966

3,238,106
NUCLEAR REACTORS
Everett Long, Cosby, John Tatlock, Culcheth, near Warrington, and John Michael Laithwaite, Wilmslow, England, assignors to United Kingdom Atomic Energy Authority, London, England
Filed July 3, 1961, Ser. No. 121,471
Claims priority, application Great Britain, July 1, 1960, 23,196/60
18 Claims. (Cl. 176—41)

This invention relates to nuclear reactors and is concerned with nuclear reactors of the type comprising a pressure vessel enclosing a moderator structure formed by a close-packed series of graphite blocks stacked one above another in columns (see for example U.K. specification No. 784,291).

It is an object of the invention to provide a new form of reactor having a moderator structure in which problems arising from irradiation—induced dimension changes are made less acute.

According to the invention, a nuclear reactor comprising a pressure vessel enclosing a moderator structure formed by a close-packed series of graphite blocks stacked one above another in columns is characterised in that the columns are individually carried by support ties.

Figure 2:
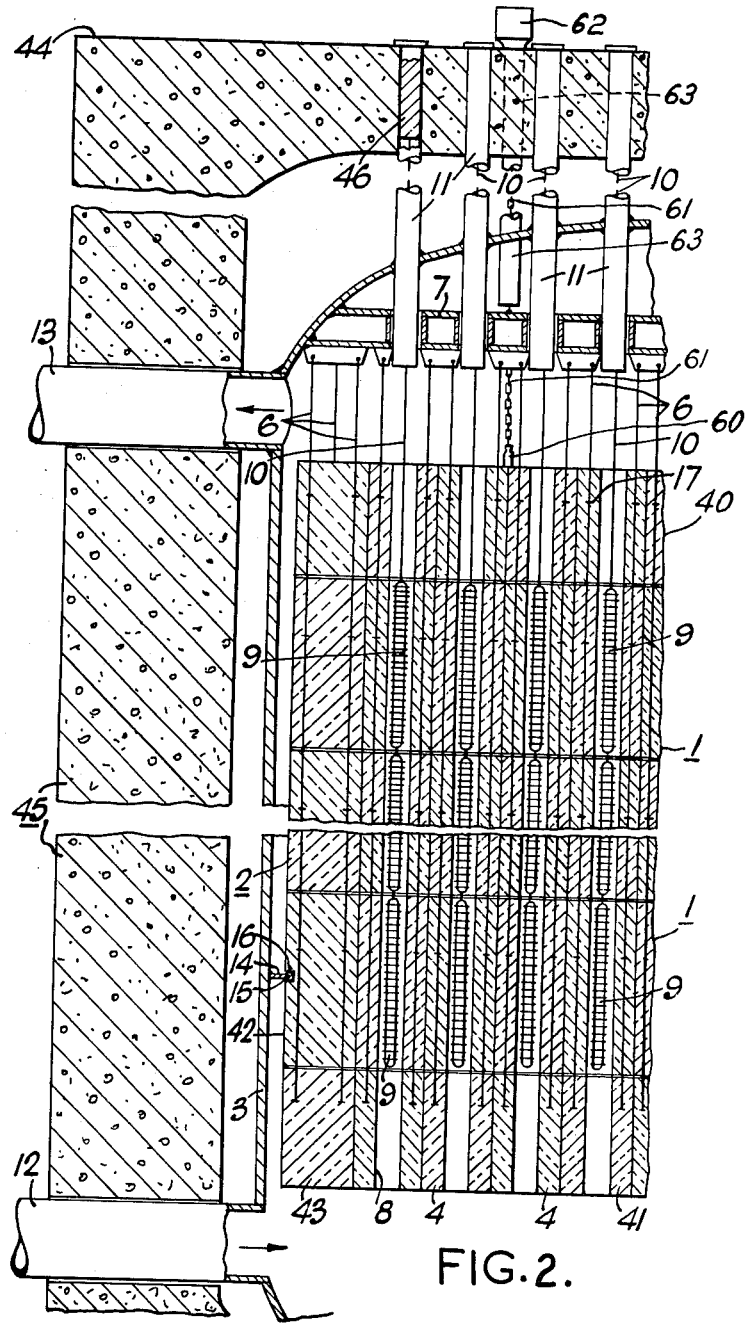

Several embodiments of the invention will now be described by way of example with reference to the accompanying drawings wherein:

FIGURE 1 is a fragmental plan view in section.
FIGURE 2 is a fragmental sectional view taken on the line II—II of FIGURE 1, with added detail.
FIGURE 3 is an enlarged detail of FIGURE 2, and
FIGURES 4, 5, 6, 7 and 8 are fragmentary details illustrating modifications.

Referring to FIGURES 1 and 2, a gas-cooled nuclear reactor 1 has a moderator structure 2 enclosed in a pressure vessel 3. The moderator 2 has top, bottom and side reflector portions 40, 41 and 42 respectively and the moderator consists of a series of columns 4 formed by elongate graphite blocks 5, 43 stacked one above the other. The columns 4 are individually carried from above by means of support ties in the form of wires 6 anchored to a box grid support structure 7 attached to the upper region of the pressure vessel 3. Each column 4 is supported by three, equi-spaced, continuous support wires 6 set out in a triangular pattern.

The blocks 5, 43 are of rectangular cross section, with the grain of the blocks running parallel to their length. The blocks 5 are penetrated by coolant channels 8 locating nuclear fuel elements 9 interconnected to form fuel element strings supported by cables 10, whereas the blocks 43 are "solid" (i.e. not penetrated by coolant channels) and form the reflector 42. Access for refuelling of the coolant channels 8 in the blocks 5 is gained by standpipes 11, the upper ends of which terminate at a charge face 44 defined by the upper face of a concrete biological shielding 45 surrounding the pressure vessel 3. The standpipes 11 are sealed at the charge face by removable shield plugs 46 which also provide support for the cables 10. Control of the reactor 1 is effected by boron-steel control rods 60 suspended by chains 61 from drive mechanisms 62 disposed above control rod standpipes 63. Access to the reactor core is provided by holes 64 defined by cutaway portions of some of the blocks 5.

Carbon-dioxide coolant gas circulated at 300 p.s.i. enters and leaves the pressure vessel 3 by way of inlet and outlet ducts 12, 13. The coolant is constrained to flow upwardly through the coolant channels 8 of the moderator 2 by a gas seal between the moderator 2 and the pressure vessel 3 formed by a diaphragm 14 supported by the pressure vessel and having a thickened edge 15 protruding into slots 16 formed in the side faces of adjacent blocks 43 of the side reflector 42.

Referring now to FIGURE 3, the weight of each block 5 (or block 43) is transmitted to its support wires 6 by means of collars 17 carried by the wires near the upper end of the block. The upper faces of the collars 17 contact shoulders defined by end faces 18 of drillings 19. Graphite sleeves 20 replace the graphite removed from the block to accommodate the fitting of the collars 17. The sleeves 20 of each block are held in place by the upper end face of the block below.

The blocks are spaced apart slightly at their end faces to allow a degree of flexibility in the columns. To prevent out-leakage of coolant from the channels 8, parallel-walled graphite sleeves 21 are provided to interconnect the blocks.

Referring to the modification illustrated in FIGURE 4, the wires 6 may be replaced by a series of ties in the form of support rods 25, two rods diametrically opposite to each other being fitted to each block 5 (or block 43). The rods 25 are end-connected by articulated joints of the ball (26) and socket (27) type, so that adjacent blocks are interconnected to provide a small degree of flexibility in the columns. A further modification is shown in the provision of graphite sleeves 21a having outer faces 22 of convex form which locate in concave recesses 23 in the ends of the blocks. The sleeves 21a preserve the continuity of the channels 8 whilst allowing slight relative angular movement to occur between the ends of adjacent blocks.

FIGURE 5 illustrates modifications to the arrangement shown in FIGURE 1, the columns 4 being end-located by sleeve-like spigots 28 attached to the upper face of a support plate 29 welded to the inner wall of the pressure vessel 3. The plate 29 is perforated by apertures 30 to allow in-flowing coolant to pass up within the spigots 28 aligned with the channels 8 of the blocks 5. The blocks 43 have shallow recesses 48 for location by the spigots 28. The plate 29 could be replaced by a grid-type support if required, but, by providing a "solid" plate, the gas seal provided by the diaphragm 14 (FIGURE 1) may be dispensed with. Side restraint to the moderator 2 is provided by an enclosing cylinder 31 carried upright on the plate 29.

FIGURE 6 illustrates a further modification wherein the blocks 5 (or blocks 43) are keyed together at their side faces by keys 33 of graphite. Each block has two slots 34 on two of its side faces and two slots 35 on the remaining two side faces. The keys 33 are a tight fit in the slots 34 and a loose fit in the slots 35. The keys 33 thus provide support of a block in the event of failure of a support wire 6 (or support rod 25) in an adjacent block.

The support wires 6 or support rods 25 may be made of any suitable material used in nuclear engineering, for example, stainless steel or zirconium. Zirconium has the advantage of lower neutron capture than stainless steel but is more expensive and is of lower tensile strength. Typically, for a column of 6 blocks each 3' in length and of 12 sq. in. section weighing about 1500 lbs., three support wires 6 of stainless steel would be of approximately 0.25" diameter and of zirconium, approximately 0.40" diameter. If two support rods 25 were used in place of the three support wires 6, their diameter would be in the order of 0.30" and 0.55" respectively for stainless steel and zirconium.

Figure 7:
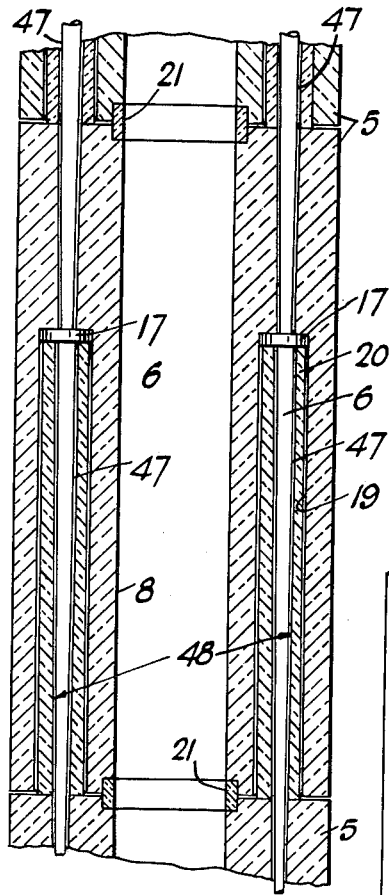

FIGURE 7 illustrates how the amount of neutron-absorbing material introduced into the reactor core by the wires 6 may be reduced by providing the wires with a slight downward taper 47 on the basis that tension is reduced towards the lower ends of the wire. The inner walls of the sleeves 20 have a corresponding slight taper 48. The degree of taper is dependent upon the weight loading of the blocks 5 (or 43) through the columns 4, which loading decreases progressively down through the columns. By progressive reduction of the cross-section of the wires 6 in this manner, it should be possible to reduce the material introduced into the reactor core by the wires 6 by about one-half, as compared with an arrangement which uses no taper.

To the same effect, if rod 25 are employed for support of the columns 4, the diameter of the rods 25 may be progressively decreased from block to block down through the columns 4.

Figure 8:
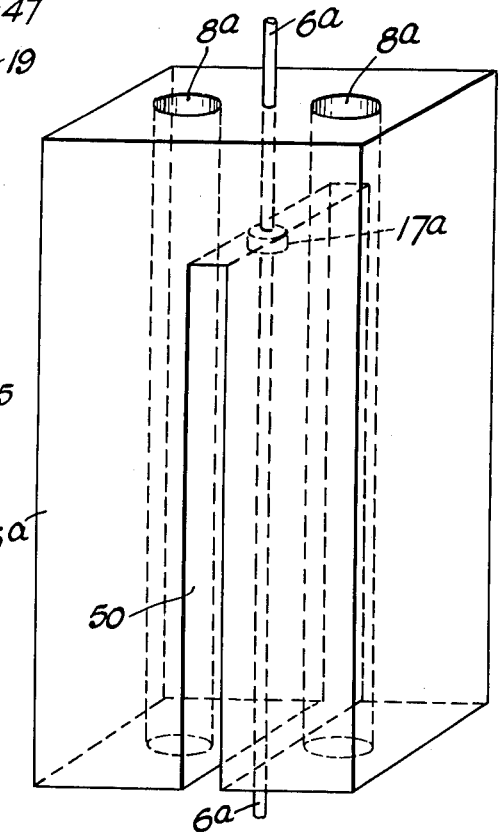

FIGURE 8 illustrates how the number of support wires for the block columns 4 can be reduced and shows a graphite block 5a penetrated by two parallel-disposed coolant channels 8a, the block being supported by a single wire 6a (or alternatively a rod similar to a rod 25) passing through the block centre, between the channels 8a. A slot 50 traverses opposed side faces at the lower end of the block 5a to extend longitudinally along the greater part of its length. The slot 50 accommodates a weight support collar 17a attached to the wire 6a and may be filled with graphite or alternatively, remain unfilled (or partly filled) to provide relief from stresses induced by irradiation growth.

By supporting the columns 4 by the support wires 6 (or rods 25) many of the problems arising from irradiation—induced dimension changes are made less acute. The columns are allowed flexibility which helps to keep the fuel element channels 8 aligned despite these dimension changes. In the described arrangement growth and shrinkage can occur more freely and hence with lower stresses.

The moderator structure 2 can be assembled with the blocks 5, 43 in contact at their side faces so that neutron streaming paths are avoided. In the absence of need for spaces, the design of the moderator structure is simplified, tiles and the like which have been a characteristic of conventional designs are no longer required.

We claim:

1. In a nuclear reactor of the type comprising a pressure vessel, a moderator structure disposed within the pressure vessel and defined by a close-packed series of moderator blocks stacked one above another in columns with fuel containing channels extending end to end through the columns, the improvement of a support structure disposed within the upper interior of the pressure vessel and means for supporting the columns individually from the support structure, said means comprising a series of tie-members depending from the support structure with the blocks of the columns supported by threading on the tie-members.

2. A nuclear reactor comprising, in combination: a pressure vessel, a support structure disposed within the upper interior of the pressure vessel, a series of flexible tie-members depending from the support structure, columns of moderator blocks threaded on the tie-members, at least some of which blocks define fuel element channels extending end to end through the columns, channel access pipes penetrating the upper end of the pressure vessel, fuel element support means in the access pipes, and fuel elements suspended in the channels from said fuel element support means.

3. A nuclear reactor comprising, in combination: a pressure vessel, a support structure disposed within the upper interior of the pressure vessel, a series of flexible tie-members depending from the support structure, columns of moderator blocks threaded on the tie members and defining fuel element channels extending end to end through the columns, fuel element support means above the columns, and fuel elements in the channels depending from the fuel element support means.

4. A nuclear reactor comprising, in combination: a pressure vessel, a support structure disposed within the upper interior of the pressure vessel, a series of tie-members depending from the support structure, a close-packed series of moderator blocks threaded in columns on the tie-members and defining fuel element channel extending end to end through the columns, channel access pipes penetrating the upper ends of the pressure vessel, shield plugs sealing said access pipes, fuel elements disposed in the channels, additional tie-members depending from the shield plugs to provide support for said fuel elements, a first coolant duct penetrating the pressure vessel below the columns, a second coolant duct penetrating the pressure vessel above the columns and means defining a gas-seal between the side-wall of the pressure vessel and the outermost columns of the packed series.

5. A nuclear reactor comprising, in combination: a pressure vessel, a support structure disposed within the upper interior of the pressure vessel, a series of tie-members depending from the support structure, a close-packed series of graphite blocks threaded in columns on the tie-members and defining fuel element channels extending end to end through the columns, channel access pipes penetrating the upper ends of the pressure vessel, shield plugs sealing said access pipes, fuel elements disposed in the channels, tie-members depending from the shield plugs to provide support for said fuel elements, a base plate traversing the lower end of the pressure vessel and below the columns, means sealing the base plate to the side-wall of the pressure vessel, means defining a series of apertures in the base plate and aligned with the channels, a series of sleeves carried by the base plate and penetrating the lower ends of the channels to align said apertures with said channels, a vertically orientated cylinder carried by the base plate and enclosing the close-packed columns to provide side restraint thereto, a first coolant duct penetrating the pressure vessel above the columns and a second coolant duct penetrating the pressure vessel below the columns.

6. A nuclear reactor comprising, in combination: a pressure vessel, a support structure disposed within the upper interior of the pressure vessel, a series of tie-members depending from the support structure, columns of end-stacked elongate, right prismatic blocks of moderator material threaded on the tie-members, said tie-members passing through the vertical axes of the blocks, each of said blocks defining two vertical, parallel-disposed coolant channels sited one on each side of the supporting tie-member and a central slot traversing opposed side faces of each block and extending along the greater part of the length thereof.

7. A nuclear reactor as claimed in claim 3 wherein said tie-members are reduced in cross-section progressively down through the columns.

8. A nuclear reactor as claimed in claim 1 wherein adjacent blocks of adjacent columns define aligned horizontal slots at their adjacent side faces, and further comprising keys disposed in the aligned slots to limit relative vertical movement between the adjacent blocks, each key having a tight fit in the slot in the side face of one of the blocks which it locates and a loose fit in the other of the slots.

9. The improvement according to claim 1 wherein the block of the columns are arranged in a spaced end-to-end relationship, and further comprising sleeve members spanning the spaces between the ends of the blocks to define continuity of said channels.

10. The improvement according to claim 9 wherein the sleeves have outer faces of convex form and are located in convex recesses in the ends of said blocks.

11. The improvement according to claim 10 wherein the tie-members are pivotably jointed between the vertically adjacent blocks.

12. The improvement according to claim 1 wherein said tie-members are tie rods extending within tie rod accommodating passaageways in the blocks, the tie rods having spaced block-supporting collars, one collar for each block to be supported, and the passageways having a cross section greater than the cross-section of said collars from the lower end face of the block upwards to the collar and of cross section less than the cross section of said collars above the collar to define stepped passageways within the blocks with the blocks supported on the collars at the steps in the passageways.

13. The improvement according to claim 12 and further comprising tubular filler members of moderator material occupying the voids between the tie rods and the passageways in the blocks below said collars.

14. In a nuclear reactor, a moderator structure defining channels for housing fissile material and for accepting coolant flow therethrough for sweeping said fissile material in heat exchange relationship, and comprising parallel columns of blocks of moderating material the blocks being arranged in spaced end-to-end relationship, sleeve members spanning the spaces between the ends of the blocks to define continuity of said channels, a support structure disposed above the columns, and tie-members connected to said support structure and passing downwards along said columns and means on said tie-members for supporting said blocks.

15. A moderator structure according to claim 14, wherein said tie-members are tie rods extending along tie rod accommodating passageways in the blocks and having spaced block-supporting collars forming the block supporting means, one collar for each block to be supported, said passageways having a cross section greater than the cross section of said collars from the lower end face of the block upwards to the collar and being of cross section less than the cross section of said collars above the collars to define stepped passageways with the blocks supported on the collars at the steps in the passageways, and tubular filler members of moderator material occupying the voids between the tie rods and the passageways in the blocks below said collars.

16. A moderator structure according to claim 14 wherein the tie-members are pivotably jointed between vertically adjacent blocks.

17. A moderator structure according to claim 14 wherein the tie-members progressively reduce in cross-sectional area towards the lower ends of the columns.

18. A moderator structure according to claim 14 wherein in each column of blocks defines at least two channels for housing fissile material and for accepting coolant flow therethrough.

References Cited by the Examiner

UNITED STATES PATENTS

| 2,863,815 | 12/1958 | Moore et al. | 176—29 |
| 2,929,768 | 3/1960 | Mahlmeister et al. | 176—41 |

FOREIGN PATENTS

| 1,198,353 | 6/1959 | France. |
| 1,211,573 | 10/1959 | France. |
| 1,211,878 | 10/1959 | France. |
| 1,214,056 | 11/1959 | France. |
| 1,214,246 | 11/1959 | France. |
| 1,222,623 | 1/1960 | France. |
| 782,888 | 9/1957 | Great Britain. |
| 826,228 | 12/1959 | Great Britain. |

REUBEN EPSTEIN, *Primary Examiner.*

CARL D. QUARFORTH, *Examiner.*